United States Patent [19]

Foster et al.

[11] 3,919,348
[45] Nov. 11, 1975

[54] EPOXY-STYRENE RESIN SYSTEM HAVING IMPROVED SHELF LIFE

[75] Inventors: Newton C. Foster, Pittsburgh; James D. B. Smith, Turtle Creek, both of Pa.

[73] Assignee: Westinghouse Electric Corporation, Pittsburgh, Pa.

[22] Filed: May 23, 1974

[21] Appl. No.: 472,754

[52] U.S. Cl............ 260/837 R; 161/184; 161/185; 260/47 EC; 260/47 EN; 260/78.4 EP; 260/836
[51] Int. Cl.$^2$.................................... C08L 63/00
[58] Field of Search.......................... 260/836, 837

[56] References Cited
UNITED STATES PATENTS

| | | | |
|---|---|---|---|
| 3,099,638 | 7/1963 | Foster | 260/837 |
| 3,256,226 | 6/1966 | Fekete | 260/837 R |
| 3,597,411 | 8/1971 | Weinrach | 260/78.4 EP |
| 3,637,618 | 1/1972 | May | 260/836 |
| 3,657,196 | 4/1972 | Foster | 260/837 R |

FOREIGN PATENTS OR APPLICATIONS

| | | | |
|---|---|---|---|
| 1,006,848 | 10/1965 | United Kingdom | 260/837 |
| 591,565 | 1/1960 | Canada | 260/837 R |

Primary Examiner—Paul Lieberman
Attorney, Agent, or Firm—D. P. Cillo

[57] ABSTRACT

An epoxy-styrene solventless resin impregnating varnish, having an atmospheric catalyzed pot life at room temperature of at least 45 days, is made by mixing: (1) the product of the reaction of (a) 1 part of an epoxy resin mixture comprising solid epoxy resin having an epoxy equivalent weight of between about 390–2500 and liquid epoxy resin having an epoxy equivalent weight of between about 100–385, wherein the weight ratio of solid epoxy: liquid epoxy is between 1:1 to 1:10; with (b) between about 0.01 to 0.06 part of maleic anhydride and (c) between about 0.0001 to 0.005 part of a catalyst selected from the group consisting of piperidine, pyridine, imidazoles, and aliphatic tertiary amines; under such conditions that the reaction between the maleic anhydride and the epoxy resin mixture is substantially complete, and the epoxy diester formed has an acid number of between about 0.5 to 3.0; with (2) a coreactive vinyl monomer, and between about 0.00030 to 0.004 part of an aromatic acidic phenolic compound, selected from the group consisting of dinitrophenols and trinitrophenols; and finally with (3) between about 0.3 to 1.2 part of a polycarboxylic anhydride, which is soluble in the mixture of (1) and (2) at temperatures between about 0° to 35°C, and an amount of free radical catalyst selected from azo compounds and peroxides that is effective to provide a catalytic effect on the impregnating varnish to cure it at temperatures over about 85°C. Upon heating at a temperature over about 85°C, the impregnating composition cures to a thermoset resin.

15 Claims, 4 Drawing Figures

EPOXY-STYRENE RESIN SYSTEM HAVING IMPROVED SHELF LIFE

BACKGROUND OF THE INVENTION

This invention relates to novel epoxy-styrene solventless resin impregnant systems having an excellent atmospheric catalyzed pot life, and the process for making such compositions. Foster, in U.S. Pat. No. 3,657,196, prereacted an epoxy resin and maleic anhydride to form a comlex half-ester. To the half ester; styrene, NADIC methyl anhydride, benzoyl peroxide, and hydroquinone reaction inhibitor was added. This provided a resinous impregnating composition having excellent electrical properties and a storage lifetime of up to about 2 months. The composition was produced by a complex reaction mechanism however, which made it difficult at times to maintain consistent batch uniformity. Besides simplifying the reaction for commercial application, it would also be desirable to have a resinous epoxy-styrene impregnating composition with an appreciably longer catalyzed life.

Ehrhart, U.S. Pat. No. 3,179,625; Cubbon, British Pat. No. 1,230,979 and Cunningham, British Pat. No. 743,494, have respectively stabilized polyurethane, styrene and polyesters with picric acid. Weinrich, U.S. Pat. No. 3,597,411, added 0.0001 to 3 percent picric acid as a curing retarder, for a hot melt, single staged epoxy-anhydride solid molding powder. What is needed, is a stabilizer that would be effective in room temperature, liquid, epoxy-styrene-anhydride impregnant systems, to prevent premature gellation during room temperature storage, yet not retard curing at elevated temperatures.

SUMMARY OF THE INVENTION

It has been found, that epoxy-styrene resin impregnating varnish systems, having excellent impregnation, shelf life and electrical properties, and which are particularly suitable for coating and impregnating large motor and generator insulation, or other insulated electrical components, can be made with consistent batch uniformity. This is accomplished by conducting an essentially complete esterification reaction between a liquid-solid epoxy resin mixture and maleic anhydride in the presence of a catalyst such as piperidine, pyridine, an imidazole, or an aliphatic tertiary amine; and then adding other ingredients such as styrene, along with critical amounts of a room temperature stabilizer such as a nitrophenol. As a final step, a polycarboxylic anhydride and a peroxide or azo compound may be added.

The method comprises reacting 1 part of an epoxy resin combination, consisting of a liquid epoxy resin having an epoxy equivalent weight of between about 100–385, and a solid epoxy resin having an epoxy equivalent weight of between about 390–2500, wherein the weight ratio of solid epoxy: liquid epoxy is between about 1:1 to 1:10, with between about 0.01 to 0.06 part of maleic anhydride in the present of between about 0.0001 to 0.005 part of a catalyst selected from the group consisting of piperidine, pyridine, imidazoles, and aliphatic tertiary amines; under such conditions that the anhydride is effective to substantially completely react with the epoxy resin mixture to form an epoxy diester having an acid number of between about 0.5–3.0. Then, to the substantially completely esterified reaction product is added: a suitable coreactive vinyl monomer such as styrene, in an amount effective to impart a short gel time to the varnish, and between about 0.00030 to 0.004 part of an aromatic acidic nitrophenol selected from the group consisting of ditronitrophenols and trinitrophenols; and finally, between about 0.3–1.2 parts of a polycarboxylic anhydride, such as NADIC methyl anhydride, which is soluble in the styrene-epoxy diester at temperatures between about 0° to 35°C, and an amount of peroxide and/or azo compound that is effective to provide a catalytic effect on the impregnating varnish at temperatures over about 85°C.

The reaction of mixtures of epoxy resins, maleic anhydride and catalyst is completed at temperatures of between about 80° to 100°C to form a diester. The styrene and nitrophenol are then added at temperatures of between about 50° to 90°C. This provides a mixture having a viscosity of between about 5 to 500 cps at 25°C. As a last step, the polycarboxylic anhydride and peroxide or azo compound are dissolved in the mixture at temperatures between about 0° to 35°C, to provide the final impregnating varnish having a viscosity of between about 5 to 500 cps at 25°C.

This solventless resin system has superior properties, such as low viscosity at room temperature, adhesiveness, chemical inertness, ease of curing, good electrical resistivity, and an atmospheric pot life of at least 45 days at 25°C. Upon cure, little pollution problems are encountered. These properties make it especially suitable for coating, impregnating and encapsulating large electrical component insulation, such as generator stator coil insulation by immersion in the composition. This operation would be commercially impractical if the large volume of impregnating varnish encapsulant did not have a pot life that would permit it to retain its low viscosity, and to be used repeatedly over a period of at least 45 days.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENT

Figure 1:
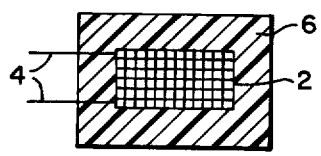
FIG. 1 shows an encapsulated electrical article made in accordance with the instant invention.

The glycidyl polyether of a dihydric phenol (epoxy resin) which may be employed in the invention is obtainable by reacting epichlorhydrin with a dihydric phenol in an alkaline medium at about 50°C, using 1 to 2 or more moles of epichlorhydrin per mole of dihydric phenol. The heating is continued for several hours to effect the reaction, and the product is then washed free of salt and base. The product, instead of being a single simple compound, is generally a complex mixture of glycidyl polyethers, but the principal product may be represented by the formula:

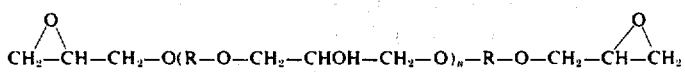

where *n* is an integer of the series 0, 1, 2, 3 . . . , and where R represents the divalent hydrocarbon radical of the dihydric phenol. Typically R is:

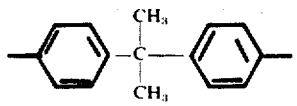

The glycidyl polyethers of a dihydric phenol used in the invention have a 1, 2 epoxy equivalency between 1.0 and 2.0. By the epoxy equivalency, reference is made to the average number of 1, 2 epoxy groups:

contained in the average molecule of the glycidyl ether. These glycidyl polyethers are commonly called bisphenol A type epoxy resins. Bisphenol A (p, p - dihydroxy-diphenyl-dimethyl methane) is the dihydric phenol used in these epoxides. These bisphenol A epoxy resins can be in solid or liquid form, and their epoxy equivalent weight can range from about 100–2500. Within this range there is a preferred range of from about 100 to 800. Thus, the epoxy resin mixture of this invention can comprise completely bisphenol A types. Use of resins having epoxy equivalent weights over about 2500 present blending problems and may result in impregnating problems.

Typical epoxy resins of bisphenol A are readily available in commercial quantities and reference may be made to the *Handbook Of Epoxy Resins*, by Lee and Neville, for a complete description of their synthesis, or to U.S. Pat. Nos. 2,324,483; 2,444,333; 2,500,600; 2,511,913; 2,558,949; 2,582,985; 2,615,007; and 2,633,458. The solid epoxy resins used in this invention must be high purity materials i.e., over about 99.5% free of residual reactive species such as amine catalysts or quarternary ammonium compounds used to upgrade or increase the molecular weight of the epoxy resins from the liquid to the solid state. Generally, the solid epoxy resins used in this invention will have an epoxy equivalent weight of between about 390–2500 and the liquid epoxy resins used in this invention will have epoxy equivalent weight of between about 100–385.

Other glycidyl ether resins that are useful in this invention include polyglycidyl ethers of a novolac. The polyglycidyl ethers of a novolac suitable for use in accordance with this invention are prepared by reacting an epihalohydrin with phenol formaldehyde condensates. While the bisphenol A-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of novolac.

The product of the reaction is generally a massive oxidation resistant aromatic compound, one example of which is represented by the formula:

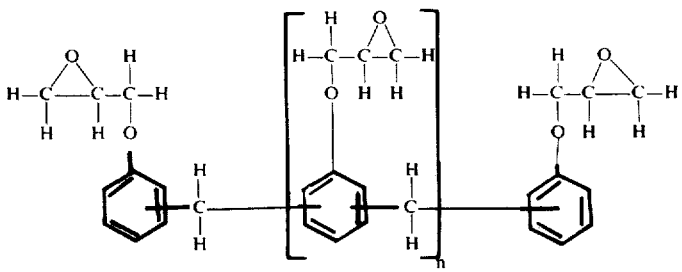

wherein *n* is an integer of the series 0, 1, 2, 3 etc.

Although novolac resins from formaldehyde are generally preferred for use in this invention, novolac resins from any other aldehyde such as, for example, acetaldehyde, chloraldehyde, butyraldehyde, fufuraldehyde, can also be used. Although the above formula shows a completely epoxidized novolac, other novolacs which are only partially epoxidized can be useful in this invention. These novolac resins can be in liquid or solid form, and their epoxy equivalent weight can range from about 100–500. Within this range there is a preferred range of from about 100 to 385. They may be used in admixture with the bisphenol A type epoxy resins in this invention.

Cycloaliphatic and acyclic aliphatic type epoxides can also be employed as ingredients in this invention. They are selected from non-glycidyl ether epoxides. They are generally prepared by epoxidizing unsaturated aliphatic or unsaturated aromatic hydrocarbon compounds, such as olefins and cyclo-olefins, using hydrogen peroxide or peracids such as peracetic acid and perbenzoic acid:

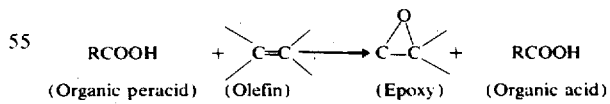

The orgaic peracids are generally prepared by reacting hydrogen peroxide with either carboxylic acids, acid chlorides, or ketones to give the compound R—COOH.

Such non-glycidyl ether epoxides are characterized by the absence of the ether oxygen near the epoxide group and are selected from those which contain a ring structure as well as an epoxide group in the molecule, the cycloaliphatic epoxides; and those which have an essentially linear structure onto which are attached epoxide groups, the acyclic aliphatic epoxides.

Examples of suitable cycloaliphatic epoxides would include 3, 4-epoxycyclohexylmethyl-3,4-epoxy cyclohexane carboxylate; vinyl cyclohexane dioxide; 3,4-epoxy-6-methylcyclohexyl methyl-3,4-epoxy-6-methylcyclohexane carboxylate, and dicyclopentadiene dioxide, having the following respective structures:

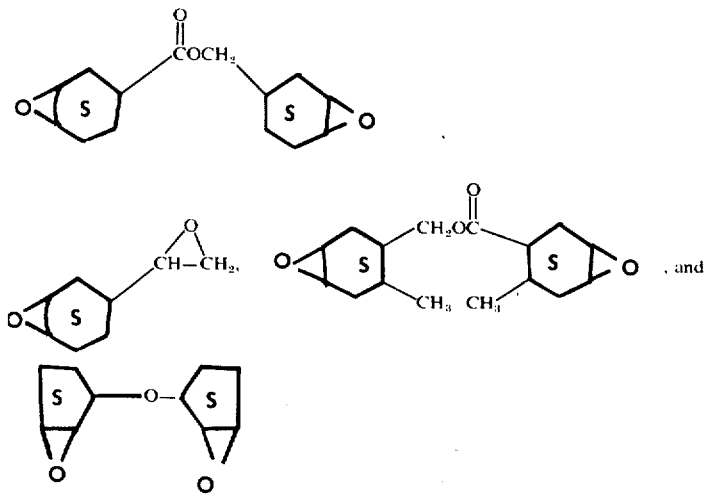

mers are products produced by treatment of a polyisoprene or polybutadiene resin with peracetic acid; for example:

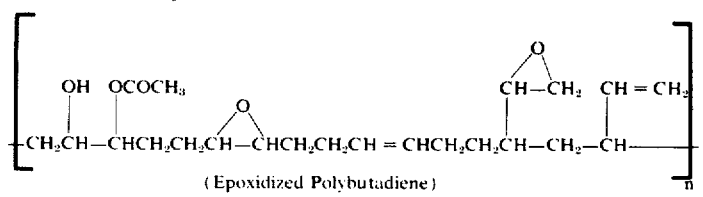

(Epoxidized Polybutadiene)

where $n$ = 25 to 250. Suitable dienes would include those having from 4 to 15 carbon atoms per molecule and the resulting epoxidized diene polymers could have from 3 to 8 percent by weight oxirane (epoxy) oxygen content.

Synthetic polyesters, suitable for making epoxy esters, are derived from the reaction of organic polybasic acids or anhydrides with polyols such as primary diols, to provide a diester:

The cycloaliphatic expoxides are normally epoxides produced by the peroxidation of cyclic olefins. A distinguishing feature of many of the non-glycidyl ether cycloaliphatic epoxides is the location of the epoxy group(s) on a ring structure rather than on an aliphatic side chain. Generally, the non-glycidyl ether cycloaliphatic epoxide will have the formula selected from the group of:

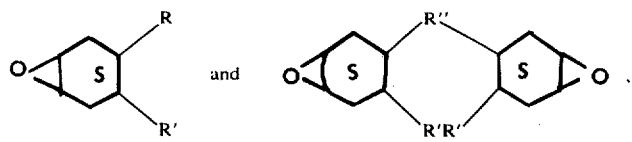

where S stands for a saturated ring structure, R is selected from the group consisting of $CHOCH_2$, $O(CH_2)_n$-$CHOCH_2$ and $OC(CH_3)_2 CHOCH_2$ radicals where $n = 1$ to 5, R' is selected from the group consisting of hydrogen, methyl, ethyl, propyl, butyl and benzyl radicals and R'' is selected from the group consisting of

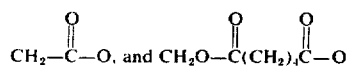

radicals.

Examples of suitable acyclic aliphatic epoxides would include epoxidized diene polymers and epoxidized polyesters. Typical of the epoxidized diene poly-

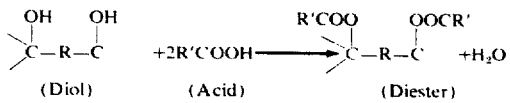

(Diol)   (Acid)   (Diester)

Either the acid or the polyol or both may contain the requisite unsaturation for R and R' in the formula above. Examples of suitable polyepoxides based on unsaturated polyesters would be those derived from oleic ($C_{18} H_{34} O_2$) or linoleic ($C_{18} H_{30} O_2$) unsaturated acids and ethylene glycol ($CH_2OH—CH_2OH$), glycerol ($CH_2OHCHOHCH_2OH$), and pentaerythritol $C(CH_2OH)_4$ and reacted with peracetic acid. Generally, R in the formula above can contain from 2 to 10 carbons and R' from 10 to 24 carbons.

The epoxidized diester will have the general formula

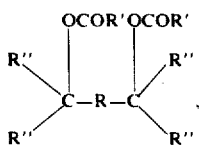

where R can be

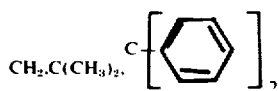

and $(CH_2)_n = 2$ to 10; R'' can be

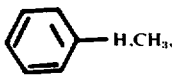 , 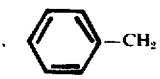

and $CH(CH_3)_2$ and OCOR' can be oleic, linoleic, gadoleic, palmitoleic and ricinoleic, with R' having 10 to 24 carbons, and a degree of unsaturation of 1 to 4 double bonds per OCOR' unit. R' could be represented as:

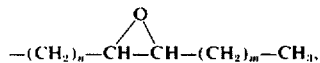

where $n$ and $m$ range from about 5 to 12. The epoxidized esters should have from about 4 to 7% by weight oxirane (epoxoy) oxygen content.

A complete description of epoxidation of dienes, and synthetic glycidyl polyesters can be found in the *Handbook of Epoxy Resins*, by Lee and Neville, Chapter 3, pages 9–17, McGraw-Hill (1967), herein incorporated by reference. These non-glycidyl ether epoxides can be in liquid a solid form and may be characterized by reference to their epoxy equivalent weight, which is defined as the weight of epoxide in grams which contains 1 gram equivalent of epoxy.

In the present invention, the suitable non-glycidyl ether epoxides are characterized by an epoxy equivalent weight of from about 100 to 600 for the cycloaliphatic type, and from about 250 to 600 for the acyclic aliphatic type. Within this range there is a preferred range of epoxy equivalency of from about 125 to 450 for the cycloaliphatic type and from about 250 to 420 for the acyclic aliphatic type.

With any of the epoxy resins used, if the ratio of solid epoxy: liquid epoxy is less than 1:1 the epoxy resins will be difficult to blend; if the ratio is greater than 1:10 i.e., excess liquid epoxy, for example 1 part solid to 11 parts liquid, crosslinking of the epoxy resins with themselves will be promoted. Also, the epoxy to hydroxy ratio will be increased, which might make the epoxy-maleic anhydride reaction difficult to control and result in gel formation. It is essential to have a combined system, because all liquid epoxy would be too reactive with the maleic anhydride and catalyst, and would not provide a substantially uncrosslinked epoxy diester. The preferred ratio of solid epoxy: liquid epoxy is from 1:1 to 1:3.

In the examples, maleic anhydride is employed as the olefinically unsaturated dicarboxylic acid anhydride capable of complete reaction with the mixture of epoxy resins, to form a diester, which is capable of reaction with the addition-polymerizable monomer. It is essential that only maleic anhydride be used in the initial reaction with the epoxy resin mixture, since other anhydrides are not as reactive and may only provide half esters. It is critical that essentially all the maleic anhydride react with the epoxy resin mixture to form diesters, which are less reactive with styrene, so that little or no maleic anhydride is left to react subsequently with the added styrene.

The maleic anhydride is effective to completely react with the epoxy resins in this invention at concentrations of between about 0.01 to 0.06 part, but preferably between about 0.03 to 0.04 part, for each part of combined solid-liquid epoxy resin. Above 0.06 part and residual maleic anhydride may be left to react later with added styrene causing instability during storage. Also, the molecular weight of the epoxy diester would be increased to the extent that the final varnish would be too viscous for impregnation. Below 0.01 part and substantially complete reaction to form a diester may not occur, there would not be enough epoxy diester cross linking sites to enable essentially complete styrene reaction, and as a result, the finally cured varnish would have inferior tensile and electrical properties.

The epoxy resin mixture and maleic anhydride must initially be reacted with between about 0.0001 to 0.005 part, for each part of combined solid-liquid epoxy resin, of a catalyst selected from the group consisting of piperidine; pyridine; imidazoles selected, for example, from the group consisting of imidazole (unsubstituted); 1-methyl imidazole; 2-methyl imidazole; 2-ethyl imidazole; 2, 4, diethyl methyl imidazole; 2-methyl-1-vinyl imidazole; 1-vinyl imidazole; 2, 5-ethyl methyl imidazole and 2, 5-diethyl imidazole among others, where the structural chemical imidazole formula is shown below:

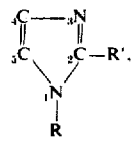

where R and R' can equal H, $CH_3$, $C_2H_5$, $C_6H_5$, $C_7H_7$, etc; and aliphatic tertiary amines selected, for example, from the group consisting of triethyl amine; tri-n-butyl amine; tri-n-propyl amine; tri-isopropyl amine and tri-isobutyl amine among others and mixtures of these materials. These materials act as catalysts, both for the primary epoxy-maleic anhydride reaction. Below 0.0001 part and there will be insufficient reaction between the epoxy resins and the maleic anhydride, causing unreacted maleic anhydride to react with styrene and cause instabiity during storage i.e., decrease pot life; above 0.005 part and the reaction becomes difficult to control, so that the mixture could gel due to epoxy resin crosslinking i.e., epoxy-hydroxy reaction.

It is essential that the solid epoxy resin, liquid epoxy resin, maleic anhydride and catalyst, such as an aliphatic tertiary amine, be reacted in critical proportions as a first step in making the impregnating varnish of this invention. They must be reacted under such conditions that there is substantially complete reaction between the epoxy resins and the anhydride, and the epoxy diester formed has an acid number, indicating completeness of the epoxy- anhydride reaction, of between about 0.5 to 3.0. This is generally accomplished at a temperature of between about 80° to 100°C for a period of time of from about 3 to 6 hours. Over about 6 hours at about 100°C tends to promote unwanted crosslinking reactions and to increase the viscosity of the composition. The mixture may then be cooled for inclusion of the vinyl monomer and inhibitor, which may be added at a temperature of between about 50° to 90°C to insure homogeneous mixture.

It is believed that almost complete esterification of the maleic anhydride takes place during the epoxy diester formation. There seems to be no evidence of half-ester material or of any significant etherification type reaction. One of the most likely reaction initiation mechanisms is believed to be as follows:

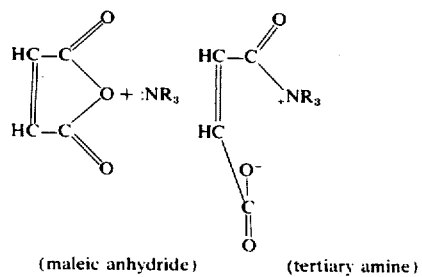

(maleic anhydride)        (tertiary amine)

When active hydrogens are present, such as hydroxyl groups on the bisphenol A epoxy, one of the reaction initiation mechanisms is believed to continue as follows:

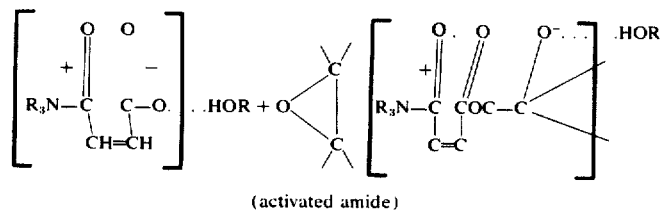

(activated amide)

to form a very small amount of amide having an O⁻... HOR activated end, where the dotted line .... indicates hydrogen bonding. This very small amount of amide is believed to act as a reaction initiator for the main reaction to form an epoxy diester:

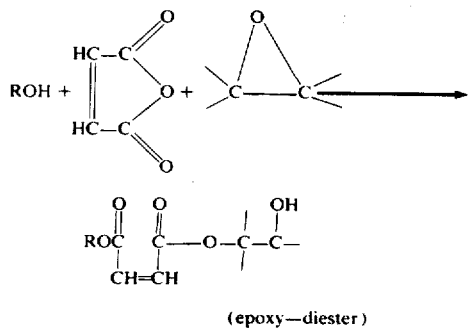

(epoxy—diester)

In the examples, styrene is used as the addition polymerizable monomer, and it is preferred because of its low cost and good dielectric and tensile properties on cure. There may also be used and substituted in the examples, however, such other liquid reactive mono ethylenically unsaturated monomers which are free of functional groups reactive with the oxirane on the epoxy resin, such as vinyl toluene, alphamethyl styrene, 2,4-dichloro styrene, paramethyl styrene, vinyl acetate, methyl methacrylate, ethyl acrylate, methyl vinyl ketone and butyl methacrylate, as well as mixtures of any two or more of these monomers.

The amount used of such monomer may be varied within rather wide limits, ranging on a weight basis from about 0.05 part to about 3 parts of monomer, but preferably about 0.5 to 2 parts of monomer per 1 part of combined solid and liquid epoxy resin mixture. Increasing the proportion of vinyl monomer used tends to decrease the viscosity of the epoxy-resin composition. Dilution with such addition-polymerizable monomer may, however, be carried to the point where the desirable properties sought to be obtained by the use of an epoxy-resin-containing composition are substantially impaired or lost, and polystyrene can be formed in the system, which can reduce the tensile and electrical properties in the cured impregnating varnish. On the other hand, the use of at least an amount of such monomer effective to impart a short gel time to the composition is required in accordance with the concept of the instant invention.

The aromatic acidic phenolic compound that must be added in the second step with the styrene is selected from the group consisting of dinitrophenols and trinitrophenols, such as, for example: 2, 4 dinitrophenol; 2, 6 dinitrophenol, di or tri nitroresorcinol etc, with picric acid (2, 4, 6-trinitrophenol) being preferred. These compounds have at least two nitro groups and at least one acidic phenolic hydroxyl group per molecule.

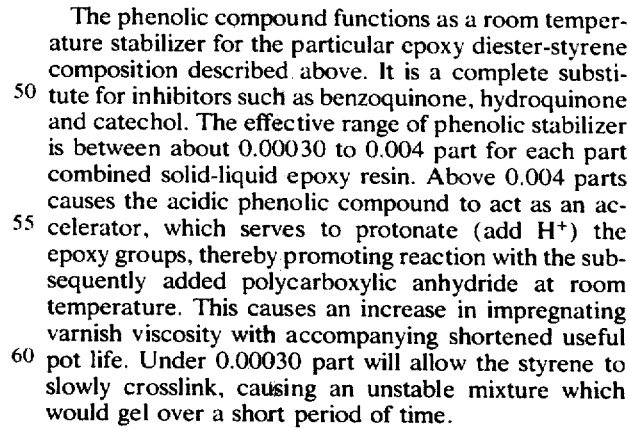

The phenolic compound functions as a room temperature stabilizer for the particular epoxy diester-styrene composition described above. It is a complete substitute for inhibitors such as benzoquinone, hydroquinone and catechol. The effective range of phenolic stabilizer is between about 0.00030 to 0.004 part for each part combined solid-liquid epoxy resin. Above 0.004 parts causes the acidic phenolic compound to act as an accelerator, which serves to protonate (add H⁺) the epoxy groups, thereby promoting reaction with the subsequently added polycarboxylic anhydride at room temperature. This causes an increase in impregnating varnish viscosity with accompanying shortened useful pot life. Under 0.00030 part will allow the styrene to slowly crosslink, causing an unstable mixture which would gel over a short period of time.

As can be seen, the mixture at this point comprises an inhibited, solventless, liquid, epoxy diester-styrene mixture. This mixture is composed of specific ingredients added in critical amounts. The viscosity at this point is between about 5 to 500 but preferably 5 to 300 cps at 25°C. The mixture can be stored, as is, or other ingredients, such as a polycarboxylic anhydride and a peroxide or azo catalyst can be added alone or in combination, at a temperature of between about 0° to 35°C.

After the epoxy resins, maleic anhydride, catalyst, styrene and inhibitor mentioned have been reacted, there are added, in accordance with the invention, one or more polycarboxylic acid anhydrides that are not reactive with styrene or other addition polymerizable monomers. These polycarboxylicacid anhydrides must be soluble in the inhibited, hexahydrophthalic epoxy diester, styrene mixture at temperatures between about 0° to 35°C. The examples disclose the use of NMA (NADIC methyl anhydride), but other similar anhydrides may be used as well, such as, for example: a eutectic mixture of tetrahydrophthalic anhydride and hexahydrophthalic anhydride, dodecenyl succinic anhydride; trimellitic anhydride; 1-methyl tetrahydrophthalic anhydride; chlorendic anhydride; benzophenone tetracarboxylic dianhydride; pyromellitic dianhydride; phthalic anhydride and 11-methyl hexylhexahydrophthalic anhydride. These may be used singly or in combination. The substantial amount of anhydride that is added is usually limited to an amount effective to react with the other compounds present, as otherwise unreacted anhydride tends to volatilize in applications involving exposure to heat and the properties of the composition are impaired.

The amount of the polycarboxylic acid anhydride that can be effectively added is between the range of about 0.3 to 1.2 part, with a preferred range of between about 0.5 to 0.6 part, for each part of combined solid-liquid epoxy resin. Above 1.2 part causes excessive residue of anhydride in the curved varnish, with accompanying reduction in electrical properties. Below 0.3 part results in insufficient reaction of the epoxy groups in the diester, with resultant inferior tensile and electrical properties in the cured varnish.

In the examples, peroxide is used as a free-radical-type high temperature catalyst for the polymerization reaction. Useful catalyst of this type are the following high temperature catalytic peroxides: 2,5-dimethyl-2,5 bis(benzoylperoxy) hexane, benzoylperoxide, dicumylperoxide, lauroyl peroxide and methyl ethyl ketone peroxide and mixtures thereof. Azo compounds, having the structural formula R—N=N—R where R can be alkyl or aryl, can also be used as the high temperature free radical type catalyst. Useful azo compounds include: 2-(tert-butylazo) isobutryonitrile

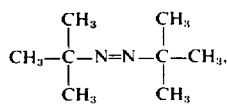

2-tert-butylazo-2,4-dimethylpentane
and preferably 1-tert-butylazo-1-phenylcyclohexane. The peroxide or azo catalyst or their mixtures must be effective to provide a catalytic effect to the impregnating varnish at temperatures over about 85°C. The effective range of high temperature peroxide or azo catalyst is between about 0.001 to 0.01 part for each part of combined solid-liquid epoxy resin. Above 0.01 part shortens the storage lifetime of the impregnating varnish. Below 0.001 part causes very long gel times at the varnish curing temperature.

The polycarboxylic anhydride and peroxide catalyst are added separately or in combination to the inhibited, epoxy diester-styrene mixture, to provide an easily curable, solventless, liquid epoxy-styrene impregnating varnish having a viscosity of between about 5 to 500 cps at 25°C. The preferred viscosity range is between about 5 to 300 cps at 25°C. The polycarboxylic anhydride and peroxide or azo are added in a final step, at a temperature between about 0° to 35°C to insure minimal reaction between the ingredients. The resultant epoxy-styrene impregnating varnish can be stored and remain stable for between about 45 days to 4 months at between 0° to 35°C. Upon heating to a temperature over about 85°C but generally between about 120° to 145°C, the impregnating composition will cure to a thermoset resin.

The resinous compositions of this invention may be mixed with suitable solid fillers which are not a catalyst for the epoxy diester-styrene mixture, such as hydrated alumina, and silica. These fillers preferably are used in finely divided form and may be used singly or in combination.

In the light of the examples hereinbelow, it will be obvious how to use the epoxy-resin compositions to produce a desired article. The articles can include potted or encapsulated electrical or electronic components; a laminated article based upon a material sufficiently heat-resistant to withstand the curing operation, such as polyethylene glycol terephthalate, in the form of fibrous sheets, as well as woven glass fiber, paper, cloth, asbestos or the like; or a casting. In most instances, if desirable properties are not obtained upon the initial curing operation, satisfactory or excellent properties are obtained after a further and prolonged baking at about 120°C. to 300°C. for about 4 to 30 hours.

As indicated heretofore, the epoxy-styrene solventless resin impregnating varnish of this invention has an atmospheric catalyzed pot life at 25°C of at least 45 days. Pot-life is defined by Lee and Neville in the *Handbook of Epoxy Resins*, as the time available for use of an epoxy system after the resin and curing agent are mixed. In applications requiring low viscosity, pot life generally ends at a viscosity of about 500 cps at processing temperatures, generally 25°C.

By a 45 day atmospheric catalyzed pot life, as described in this invention, is meant: that the epoxy diester-styrene-anhydride-free radical catalyst system of this invention will remain below 500 cps at 25°C and will not form a semi-solid gel upon exposure to air at 25°C for at least 45 days. Air helps to inhibit the reaction of styrene with the diester, and it is believed that air also may react with the nitrophenol inhibitor to make the inhibitor more effective. The epoxy diester-styrene-anhydride-free radical catalyst system of this invention will remain useful as a low viscosity impregnant for at least 45 days i.e. its viscosity will remain below 500 cps, generally below about 300 cps.

The epoxy diester-styrene reaction to a semi-solid gel is very fast; the system may remain, for example, at a viscosity of from 100 to 250 cps for 3 months, and then overnight proceed to a semi-solid gel i.e., a system having a viscosity of over about 2,000,000 cps at 25°C. When it does gel, it may separate into an epoxy diester styrene and a polystyrene system. The test to be used in determining pot life in this invention is: the number of days required, for a sample of this system to pass 500 cps at 25°C and proceed to form a semi-solid gel having a viscosity over about 2,000,000 cps at 25°C, when placed in a test tube, such as a standard Gardner-Holt bubble tube, open to air or stoppered with an air permeable cork, at 25°C.

In commercial practice, the varnish of this invention may be stored at about 5°–10°C in sealed vats to keep out moisture, in volumes of up to about 7000 gallons, generally under nitrogen gas for safety. It may then be fed to impregnating tanks in an air environment and replenished as used. In such a low temperature storage replenishing operation, the pot life of this system could become infinite.

FIG. 1 shows an insulated electrical member such as a coil 2, which has leads 4, potted in a cured insulating casting 6, the casting being a resinous composition applied to the member. FIG. 1 is thus illustrative of certain articles of the invention, namely, electrical or electronic components potted or encapsulated in the epoxy-resin compositions of this invention.

Figure 2:
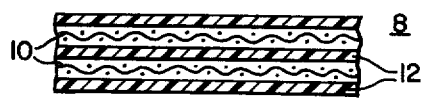
FIG. 2 shows a resinous laminate made in accordance with the instant invention.

FIG. 2 shows a laminate 8, made of individual plies 10 of resin impregnated and/or resin coated woven glass cloth. The laminate is bound into a unitary structure by the resin layer 12 of cured epoxy resin in accordance with the invention, and is thus illustrative of the laminated articles of the invention.

Figure 3:
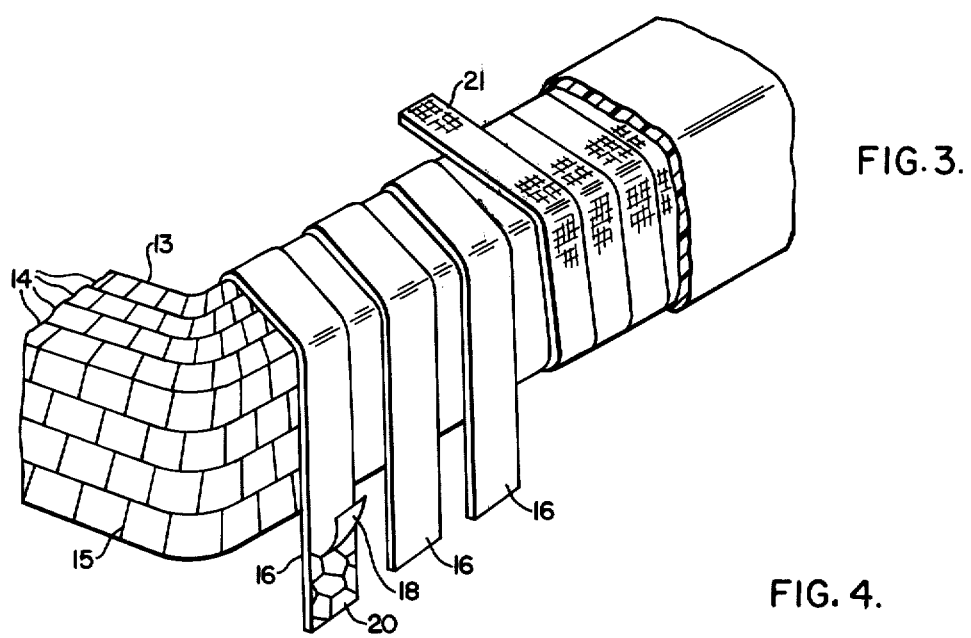
FIG. 3 shows a wrapped, resin-impregnated coil made in accordance with the instant invention.

The invention will not be described with particular reference to the preparation and impregnation of coils suitable for use in high-voltage generators. Referring to FIG. 3 of the drawings, there is illustrated a coil 13, comprising a plurality of turns of conductors 14. Each turn of the conductor 14 consists essentially of a copper bar or wire wrapped with turn insulation 15. The turn insulation 15, preferably is prepared from a fibrous sheet or strip impregnated with a bonding resinous insulation. While the bonding resinous insulation may consist solely of a coating of uncured varnish or resin, it is preferred that it comprise a wrapping of fibrous material treated with a bonding resin. Glass fiber cloth, paper asbestos cloth or abestos paper treated with a resin may be used with equally satisfactory results. The resin applied to the turn insulations to bond them together may be a phenolic resin, an alkyd resin, a melamine resin or the like, or mixtures of any two or more of these.

The turn insulation is not adequate to withstand the severe voltage gradients that will be present between the conductor and ground when the coil is installed in a high-voltage generator. Therefore, ground insulation for the coil is provided by wrapping one or more layers of composite mica tape 16 about the turn 14. Such composite tape 16 comprises a pliable backing sheet 18 of poly-ethylene glycol terephthalate mat, having a layer of mica flakes 20 bonded thereto by a liquid resinous binder. The tape may be applied half lapped, butted or otherwise. Generally, a plurality of layers of the composite tape 16 are wrapped about the coil with sixteen or more layers generally being used for high voltage coils. To impart better abrasion resistance and to secure a tighter insulation, a wrapping of a tape 21 of a tough fibrous material, for example, glass fiber, asbestos or the like is applied to the coil.

Figure 4:
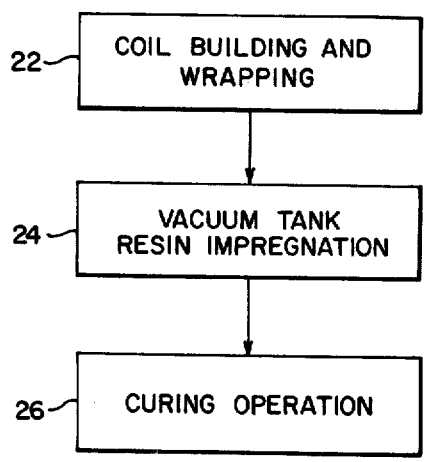
FIG. 4 is a flow sheet of the process for impregnating a coil.

In FIG. 4 of the drawings, there is a schematic illustration of the process steps which may be followed in preparing an insulated high voltage generator coil in accordance with this invention. The first step 22, comprises the building and wrapping of a coil as described above. The coil so prepared then is introduced into a vacuum impregnating tank 24 and may be subjected to a heat drying and evacuating operation to remove substantially all moisture, air and other undesirable volatile material from the coil. The polymerizable resinous composition of this invention is then introduced into the tank until the coil is completely submerged in the composition.

While the coil is completely covered with the polymerizable resinous composition, atmospheric air or a gas such as nitrogen or carbon dioxide is introduced into the impregnating tank under pressure to assist the polymerizable composition in penetrating completely into the interstices of the coil 13, and to assure substantially complete filing thereof. The impregnating treatment need not be of long duration. Ten minutes under pressure ordinarily is sufficient to completely impregnate and saturate small windings; longer impregnation periods, however, for example up to several hours or more, insure the most complete penetration and saturation of larger coils and windings. It will be understood that while vacuum impregnation produces the best results, ordinary immersions under atmospheric conditions will give good results.

The impregnated but uncured coil then is withdrawn from the impregnating tank, drained briefly and subjected to a curing operation 26. In some cases the coil is wrapped with an impervious tape to prevent escape or loss of the liquid composition therefrom during the curing operation. One preferred method of curing the polymerizable resinous composition comprises placing the impregnated coil in a sizing and curing press, provided with heating elements such as hot water pipes, electric heating members or the like. The polymerizable resinous composition may be cured on the coil while the same is in the mold by subjecting the same to heat to polymerize and cure the resin to a hard, insoluble and infusible solid. In other cases the wrapped coils can be put into an oven and cured by heating to temperatures above 85°C., for example, up to about 135°C. These coils, having a body of cured resinous insulation applied to the electrical windings making up the coil, can be used in transformers where they are disposed about a magnetic core.

EXAMPLE 1

An epoxy-styrene solventless resin impregnating varnish was prepared. A two component epoxy resin system was first made by mixing 3.25 parts of a solid low melting diglycidyl ether of bisphenol A, having an epoxy equivalent weight of about 475–575, a purity of about 99.5%, and a Durran's melting point of about 70°–80°C (sold commercially by Dow Chemical Company under the Tradename DER-661) with 6.75 parts of a liquid diglycidyl ether of bisphenol A, having an epoxy equivalent weight of about 180–200 and a viscosity of between 10,000–16,000 cps at 25°C (sold commercially by Jones-Dabney Company under the Tradename Epi-Rez 510). The resins were well blended, and the ratio of solid epoxy to liquid epoxy was 1:2.1.

The resins were then heated to 90°C. Then, to the 10 parts of combined solid-liquid epoxy resin was added 0.375 part of maleic anhydride of about 99.5% purity and 0.004 part of benzyl dimethyl amine as a catalyst. The catalyzed epoxy-anhydride was held at 90°C for about 6 hours, during which time it was occasionally stirred, to substantially completely react all of the maleic anhydride, and effect a reaction to the complete epoxy diester stage. The epoxy diester remained fluid, and did not gel. It is important to use high purity epoxy materials, since inclusion of impurities may upset the critical weight % balance and reaction mechanisms of these materials.

The acid number of the epoxy diester formed was about 2.5, indicating substantially complete reaction i.e., about 0.1% maleic anhydride left unreacted. This value was determined by using the standard acid test, where 1 gram of the epoxy diester was dissolved in 25 grams of dioxane solvent in a flask. Two drops of phenol phthalein indicator was added to color the solution, which was then titrated to the end point with 0.05 N potassium hydroxide. The % maleic anhydride left unreacted was also confirmed using infrared spectral measurements on a Perkin Elmer 700 Spectrophotometer using a smeared epoxy diester sample on NaCl plates. The maleic anhydride concentrations were computed from the absorption intensity of the anhydride band at 1835 cm$^{-1}$. The reference absorption band used in these measurements was the aromatic peak at 1860 cm$^{-1}$. The ratio of the two absorption bands was used as a measure of the rate of reaction of maleic anhydride.

Eight parts of styrene vinyl monomer, to be used as a diluent, was mixed with 0.0070 part picric acid containing 10% water 0.0063 part picric acid) to be used as a room temperature reacting inhibitor. The epoxy diester was allowed to cool to about 60°C, and then styrene-picric acid mixture was added and stirred in. The inhibited liquid epoxy diester-styrene mixture was allowed to cool to 25°C and the viscosity was measured to be about 200 cps at 25°C.

To this inhibited epoxy diester-styrene mixture 5.49 parts of NADIC methyl anhydride and 0.048 part of 2,5-dimethyl-2,5 bis(benzoyl peroxy) hexane catalyst (sold by Wallace & Tiernan Inc. under the tradename of Luperox 118) were added, as a final step, at 25°C, to provide the solventless epoxy-styrene impregnating varnish. The catalyst used has a catalytic reaction "kick off" temperature of about 115°C i.e. it will have a definite catalytic effect to initiate a cure reaction at over about 115°C. The viscosity of the epoxy-styrene impregnating varnish was measured to be about 200 cps at 25°C.

This varnish was prepared in 1 gallon laboratory batches and in 250 gallon large scale commercial batches. The 250 gallon batches used an equivalent amount of a solid low melting diglycidyl ether of bisphenol A having an epoxy equivalent weight of about 450–525, a purity of about 99.5% and a Durran's melting point of about 65°–75°C (sold commercially by Jones Dabney Company under the Tradename Epi-Rez 520-C) instead of the solid bisphenol A epoxy DER-661.

Storage properties as shown by the change in viscosity of the epoxy-styrene impregnating varnish were measured, in air, by placing 10 gram samples in standard, pyrex, Gardner-Holt thin walled bubble test tubes of about 10–12 milliter volume, with a 1 milliter air gap. These were stored at 25°C, with intentional exposure to a high degree of fluorescent light irradiation. The tubes were lightly stoppered with an air porous cork which permitted a certain amount of air flow. The epoxy-styrene impregnating varnish had an atmospheric catalyzed pot life of 112 days at a viscosity between about 200–250 cps at 25°C, before the formulation reacted, quickly passed 500 cps as measured by the standard Gardner-Holt Test (ASTM No. D154–56). AT this time it passed its useful potlife value. It quickly then reached a semi-solid gel at about 2,000,000 cps at 25°C.

Fifty-five gallon quantities of the impregnating varnish were also stored in sealed drums, with an air gap of about 1 inch at 25°C, and the varnish had a catalyzed lifetime of 53 days, before the formulation reached a semi-solid gel. In another test, a glass marble was placed in a jar, which was then filled with the epoxy-styrene impregnating varnish and sealed to almost eliminte air. The jar was then placed in an oven at 40°C. The jar was rotated daily until the marble was unable to drop through the resin. The varnish under these conditions had a catalyzed lifetime of 38 days, before the formulation reached a semi-solid gel.

As can be seen, free air circulation promotes longer pot life values in this system. We consider the Gardner-Holt tube test to be an excellent measure of pot life; the storage life of this system would have been longer had not the samples been subjected to fluorescent irradiation which tends to kick off the epoxy diester-styrene action.

Samples of the epoxy-styrene impregnating varnish were placed in an aluminum cup and baked in an oven at about 135°C. After about 10 minutes a soft gel was formed. Continued baking at about 135°C for about 8 hours produced a clear, tough, rigid, cured, thermoset resin.

EXAMPLE 2

Sample compositions were prepared in this example, to compare the storage properties of epoxy-styrene impregnating varnishes containing catechol $C_6H_4(OH)_2$, cresylic acid and a variety of quinones, all of which are known inhibitors for epoxy-anhydride-styrene systems. All of these samples are illustrative of compositions outside of applicants' invention.

All the samples were reacted using the same times and temperatures as in example 1, and using the same ingredients except: Sample 2 (a) did not include any benzyl dimethyl amine and substituted 0.0067 parts of parabenzoquinone for the 0.0063 parts of picric acid; Sample 2 (b) substituted 0.0067 parts of parabenzoquinone for the 0.0063 parts of picric acid; Sample 2 (c) substituted 0.0067 parts 2,5,-ditertiary butyl hydroquinone for the picric acid; Sample 2 (d) substituted 0.0067 parts of tertiary butyl hydroquinone for the picric acid; Sample 2 (e) substituted 0.0067 parts of catechol for the picric acid and Sample 2 (f) substituted 0.0067 parts of cresylic acid a blend of

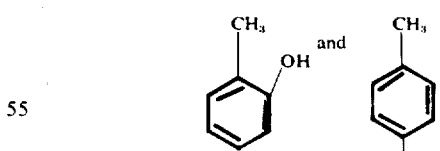

for the picric acid

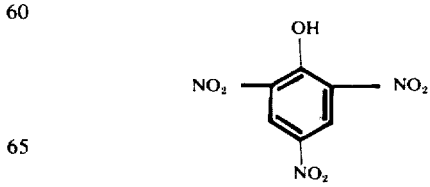

The results of pot life and other storage tests are shown in Table 1 below:

TABLE I

| Varnish Sample: (epoxy-amine-styrene -anhydride-inhibitor | 25°C 10 gr in test tube (pot life test: ASTMD154-56 to over 500 cps) | Storage Test 55 gal in a sealed drum to semi- solid gel | 40°C sealed jar to semi- solid gel |
|---|---|---|---|
| EXAMPLE 1 Picric acid inhibitor | 112 days | 53 days | 38 days |
| SAMPLE 2(a) no amine, p-benzoquinone inhibitor | — | — | 11 days |
| SAMPLE 2(b) p-benzoquinone inhibitor | 15 days | 28 days | 15 days |
| SAMPLE 2(c) 2,5,-ditertiary butyl- hydroquinone inhibitor | 21 days | — | — |
| SAMPLE 2(d) tertiarybutyl- hydroquinone inhibitor | 20 days | 28 days | |
| SAMPLE 2(e) catechol inhibitor | 21 days | — | — |
| SAMPLE 2(f) cresylic acid inhibitor | 28 days | — | — |

As can be seen, complete substitution of a nitrophenol for catechol, cresylic acid and a wide variety of quinones, provides at least a 90% increase, and in some cases as high as a 300% increase in storage stability for this epoxy-amine-styrene-anhydride system. A catalyzed pot life of at least 45 days in air at 25°C and 25 days at 40°C in a limited air environment is considered minimal.

EXAMPLE 3

Sample compositions were prepared in this example varying the amount of picric acid in the composition. All the Samples were reacted using the same times and temperatures as in example 1.

The Samples contained 3.75 parts Epi-Rez 520-C solid epoxy resin, 6.25 parts Epi-Rez 520 liquid epoxy resin, providing a ratio of solid epoxy to liquid of 1:1.65; 0.375 part of maleic anhydride, 0.004 part of benzyl dimethyl amine; 8.0 parts of styrene; 5.49 parts of NADIC methyl anhydride and 0.048 parts of 2,5-dimethyl-2,5bis (benzoyl peroxy) hexane catalyst. Sample 3(a) contained 0.007 part picric acid, Sample 3(b) contained 0.0035 part picric acid and Sample 3(c) contained 0.0017 part picric acid.

These three sample compositions were completely sealed in a jar containing one glass marble, as in example 1, and placed in an oven at 40°C. The jar was rotated daily until the marble was unable to drop through the resin. The catalyzed lifetime under these conditions was 52 days for Sample 3(a); 27 days for Sample 3(b) and 15 days for Sample 3(c). In this type test a catalyzed pot life of at least 25 days at 40°C is considered minimal. The effective lower limit of picric acid would be about 0.0030 part for 10 parts solid-liquid epoxy mixture or about 0.00030 part per part epoxy mixture. A portion of Sample 3(a), containing 0.007 part of picric acid, was gelled in the form of a casting ⅛ inch thick, by being heated at 135°C for 4 hours, and at 150°C for another 16 hours. The casting exhibited the following electrical properties shown in Table II below:

TABLE II

| Temperature | Power Factor | Dielectric Constant |
|---|---|---|
| 100°C | 5.9 | 5.4 |

TABLE II-continued

| Temperature | Power Factor | Dielectric Constant |
|---|---|---|
| 125°C | 6.0 | — |

EXAMPLE 4

An epoxy-styrene solventless resin impregnating varnish was prepared. A two component epoxy resin system was first made by mixing 3.75 parts of solid Epi-Rez 520-C epoxy resin with 6.25 parts of liquid Epi-Rez 510 epoxy resin. The resins were well blended and the ratio of solid epoxy to liquid epoxy was 1:1.65.

The resins were then heated to 90°C. Then to the 10 parts of combined solid-liquid epoxy resin was added 0.375 part of maleic anhydride of about 99.5% purity and 0.004 part of benzyldimethyl amine as a catalyst. The catalyzed epoxy-anhydride was held at 90°C for about 6 hours, during which time it was occasionally stirred, to substantially completely react all of the maleic anhydride, and effect a reaction to the complete epoxy diester, which remained fluid and did not gel. The acid number of the epoxy diester formed was about 2.5, indicating substantially complete reaction.

Nineteen parts of styrene vinyl monomer, was mixed with 0.001 part picric acid containing 10% water 0.009 parts picric acid. The epoxy diester was allowed to cool to about 60°C, and then the styrene-picric acid mixture was added and stirred in. The inhibited liquid epoxy-diester styrene mixture was allowed to cool to 25°C and the viscosity was measured and recorded about 20 cps at 25°C.

To this inhibited epoxy diester-styrene mixture 5.49 parts of NADIC methyl anhydride and 0.07 part of 2,5 dimethyl-2,5 bis(benzoyl peroxy) hexane catalyst were added, as a final step, at 25°C, to provide the solventless epoxy-styrene impregnating varnish. The viscosity of the epoxy-styrene impregnating varnish was measured to be about 20 cps at 25°C. This varnish was prepared in 250 gallon large scale batch.

To test the applicability of the product as a generator coil impregnant, 10 copper test bars, measuring 0.5 × 2 × 45 inches, were taped with a mica splitting tape containing about 6% uncured bisphenol A epoxy resin as an adhesive on a Dacron polyester web backing material. The mica splitting-Dacron tape was applied as a 0.77 inch turn insulation on the bars, with a final layer of Dacron web. The test bars were then vacuum impregnated with the above described epoxy-styrene impregnating varnish. The pressure was held at 45 psi. for 1 hour. The test bars were then cured in an oven at 150°C for 16 hours. Due to the excellent impregnation properties and low viscosity, the insulated bars were easily and thoroughly impregnated with the varnish which cured to a thermoset state and imparted excellent electrical properties.

These impregnated cured bars have high heat distortion temperatures, low polymerization shrinkage, excellent thermal stability, low power factor and improved resistivity after humidification. Because of such properties insulated electrical or electronic components coated with or impregnated with the composition of this invention are particularly suitable for high voltage application i.e., for applications involving exposure to more than about 7200 volts.

Electrical measurements were carried out as follows: The resin impregnated bars were made electrodes, by painting a conducting resinous material containing finely dispersed silver on the ends of all ten test bars. Power factor (100 × tan δ) measurements were made at two different voltages. The bars exhibited the following electrical properties, shown in Table III below:

TABLE III

| Applied Voltage | Power Factor | | | |
|---|---|---|---|---|
| (kv) | 25°C | 100°C | 125°C | 150°C |
| 3.1 | 0.62 | 2.65 | 5.02 | 10.57 |
| 12.4 | 1.09 | 4.28 | 7.09 | 12.95 |

This data shows that the above formulation is suitable for use as a high voltage solventless impregnant in the manufacture of electrical generating equipment.

We claim:
1. A resinous composition comprising the product of:
   A. an epoxy diester, formed from the reaction of:
      I. 1 part of a mixture of a solid epoxy resin having an epoxy equivalent weight of between about 390–2500 and a liquid epoxy resin having an epoxy equivalent weight of between about 100–385, wherein the weight ratio of solid epoxy resin: liquid epoxy resin is between about 1:1 to 1:10, with
      II. between about 0.01 to 0.06 part of maleic anhydride and about 0.0001 to 0.005 part of a catalyst selected from the group consisting of piperidine, pyridine, imidazoles and aliphatic tertiary amines and mixtures thereof, wherein substantially all of the maleic anhydride is reacted with the epoxy resin mixture to form an epoxy diester having an acid number of between about 0.5 to 3.0 to which is added
   B. between about 0.05 to 3.0 parts of a vinyl monomer co-reactive with the epoxy diester and about 0.00030 to 0.004 part of an aromatic nitrophenol selected from the group consisting of dinitrophenols and trinitrophenols and mixtures thereof; to form a solventless, resinous composition, having a viscosity of between about 5 to 500 cps at 25°C.

2. The composition of claim 1 finally mixed with about 0.3 to 1.2 parts a polycarboxylic anhydride which is soluble in the composition of claim 1 at temperature of between about 0°C to 35°C, and an amount of a free radical catalyst selected from the group consisting of azo compounds and peroxies and mixtures thereof that is effective to provide a catalytic curing effect at a temperature over about 85°C; to provide an epoxy-styrene solventless impregnating varnish, having a viscosity of between about 5 to 500 cps at 25°C, and an atmospheric catalyzed pot life at 25°C of at least 45 days.

3. The solventless impregnating varnish of claim 2, wherein the solid epoxy resin is at least 99.5% pure.

4. The solventless impregnating varnish of claim 3, wherein the epoxy resins are diglycidyl ethers of bisphenol A, and the solid epoxy resins have an epoxy equivalent weight of between about 390–800.

5. The solventless impregnating varnish of claim 3, wherein the catalyst is an aliphatic tertiary amine, the vinyl monomer is selected from the group consisting of styrene vinyl toluene, alphamethyl styrene, 2,4-dichlorostyrene, paramethyl styrene, vinyl acetate, methyl methacrylate, ethyl acrylate, methyl vinyl ketone, butyl methacrylate and mixtures thereof, and about 0.01 to 0.001 part of free radical catalyst is used in the reaction.

6. The solventless impregnating varnish of claim 5, wherein the aromatic nitrophenol is selected from the group consisting of picric acid; 2,4 dinitrophenol; 2,6 dinitrophenol, dinitroresorcinol and trinitroresorcinol and mixtures thereof; and the polycarboxylic anhydride which is mixed with the formed epoxy diester selected from the group consisting of NADIC methyl anhydride, a eutectic mixture of tetrahydrophthalic anhydride and hexahydrophthalic anhydride, dodecenyl succinic anhydride, trimellitic anhydride, methyl tetrahydrophthalic anhydride, chlorendic anhydride, benzophenone tetracarboxylic dianhydride, pyromellitic dianhydride, phthalic anhydride and 1-methyl hexahydrophthalic anhydride and mixtures thereof.

7. The solventless impregnating varnish of claim 5, impregnated into electrical component insulation, and cured at a temperature over about 85°C, to form a thermoset resin.

8. An insulated electrical member and a cured body of resinous insulation applied to the member, the insulation comprising the cured resinous composition of claim 5.

9. An insulated electrical transformer comprising a magnetic core, electrical windings disposed about the magnetic core, and having a body of cured resinous insulation applied to the electrical windings, the insulation comprising the cured resinous composition of claim 5.

10. A resinous composition, useful for impregnating insulated electrical components, consisting essentially of the product of mixing:
    A. an epoxy diester, formed from an essentially complete esterification reaction of:
       I. 1 part of a mixture of a solid epoxy resin having an epoxy equivalent weight of between about 390–800 and a liquid epoxy resin having an epoxy equivalent weight of between about 100–385, wherein the weight ratio of solid epoxy resin: liquid epoxy resin is between about 1:1 to 1:10, with
       II. between about 0.01 to 0.06 part of maleic anhydride and about 0.0001 to 0.005 part of an aliphatic tertiary amine catalyst, wherein substantially all of the maleic anhydride is reacted with the epoxy resin mixture to form an epoxy diester having an acid number of between about 0.5 to 3.0 to which is added B. between about 0.05 to 3.0 parts of styrene, about 0.00030 to 0.004 part of picric acid as a stabilizer for the diester-styrene mixture, about 0.3 to 1.2 parts of a polycarboxylic anhydride which is soluble in the epoxy diester-styrene-picric acid mixture at temperatures of between about 0°C to 35°C, and about 0.01 to 0.001 part of peroxide catalyst that is effective to provide a catalytic curing effect on the mixture at a temperature over about 85°C; to provide an epoxystyrene solventless impregnating varnish, having a viscosity of between about 5 to 500 cps at 25°C and an atmospheric catalyzed pot life at 25°C of at least 45 days.

11. A method of making an epoxy-styrene solventless impregnating varnish, comprising the steps of:

A. reacting at a temperature of between about 80°C to 100°C;
  I. 1 part of a mixture of solid epoxy resin having an epoxy equivalent weight of between about 390–2500 and a liquid epoxy resin having an epoxy equivalent weight of between about 100–385, wherein the weight ratio of solid epoxy resin: liquid epoxy resin is between about 1:1 to 1:10, with
  II. between about 0.01 to 0.06 part of maleic anhydride and about 0.0001 to 0.005 part of a catalyst selected from the group consisting of piperidine, pyridine, imidazoles and aliphatic tertiary amines and mixtures thereof, so that substantially all of the maleic anhydride reacts with the epoxy resin mixture to form an epoxy diester having an acid number between about 0.5 to 3.0, and then B. mixing the epoxy diester at a temperature of between about 50°C to 90°C with about 0.05 to 3.0 parts of a vinyl monomer co-reactive with the epoxy diester and about 0.00030 to 0.004 part of an aromatic nitrophenol selected from the group consisting of dinitrophenols and trinitrophenols and mixtures thereof, to form an epoxy diester-styrene-nitrophenol composition having a viscosity of between about 5 to 500 cps at 25°C; and then C. mixing the epoxy diester-styrene-nitrophenol composition at a temperature of between 0°C to 35°C with about 0.3 to 0.8 part of a polycarboxylic anhydride which is soluble in the epoxy diester-styrene-nitrophenol composition at a temperature of between about 0°C to 35°C, and an amount of a free radical catalyst selected from the group consisting of azo compounds and peroxides and mixtures thereof that is effective to provide a catalytic curing effect for the mixture at a temperature over about 85°C; to provide an epoxy-styrene solventless impregnating varnish, having a viscosity of between about 5 to 500 cps at 25°C and an atmospheric catalyzed pot life at 25°C of at least 45 days.

12. The method of claim 11, wherein the solid epoxy is at least 99.5% pure.

13. The method of claim 12, wherein the epoxy resin is a diglycidyl ether of bisphenol A, and the solid epoxy resins have an epoxy equivalent weight of between about 390–800.

14. The method of claim 12 wherein the epoxy mixture and maleic anhydride are reacted for about 3 to 6 hours in step (A), the catalyst is an aliphatic tertiary amine, the vinyl monomer is selected from the group consisting of styrene, vinyl toluene, alphamethyl styrene, 2,4-dichlorostyrene, paramethyl styrene, vinylacetate, methyl methacrylate, ethyl acrylate, methyl vinyl ketone, butyl methacrylate and mixtures thereof, and about 0.01 to 0.001 part of peroxide catalyst is used in step (C).

15. The method of claim 14 wherein the aromatic nitrophenol is selected from the group consisting of picric acid; 2,4 dinitrophenol; 2,6 dinitrophenol; dinitroresorcinol and trinitroresorcinol and mixtures thereof, and the polycarboxylic anhydride which is mixed with the formed epoxy diester in step (C), is selected from the group consisting of NADIC methyl anhydride, a eutectic mixture of tetrahydrophthalic anhydride and hexahydrophthalic anhydride, dodecenyl succinic anhydride, trimellitic anhydride, methyl tetrahydrophthalic anhydride, chlorendic anhydride, benzophenone tetracarboxylic dianhydride, pyromellitic dianhydride, phthalic anhydride and 1-methyl hexahydrophthalic anhydride and mixtures thereof.

* * * * *